(12) United States Patent
Wu et al.

(10) Patent No.: US 7,236,478 B2
(45) Date of Patent: Jun. 26, 2007

(54) METHOD AND APPARATUS FOR DOWN-LINK FEEDBACK MULTIPLE ANTENNA TRANSMISSION IN WIRELESS COMMUNICATION SYSTEM

(75) Inventors: Hebing Wu, Shen Zhen (CN); Jinlin Zhang, Shen Zhen (CN); Jiang Li, Shen Zhen (CN); Qi Ding, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 923 days.

(21) Appl. No.: 10/434,251

(22) Filed: May 8, 2003

(65) Prior Publication Data

US 2003/0231606 A1    Dec. 18, 2003

Related U.S. Application Data

(63) Continuation of application No. PCT/CN02/00087, filed on Feb. 10, 2002.

(30) Foreign Application Priority Data

Jul. 20, 2001  (CN) .............................. 01 1 26301

(51) Int. Cl.
| H04B 7/00 | (2006.01) |
| H04B 7/26 | (2006.01) |
| H04B 1/06 | (2006.01) |
| H04B 7/02 | (2006.01) |

(52) U.S. Cl. ...................... 370/334; 370/335; 455/355; 375/267

(58) Field of Classification Search ................ 370/228, 370/204, 334, 335; 455/355; 375/347
See application file for complete search history.

(56) References Cited

U.S. PATENT DOCUMENTS

| 5,828,658 | A  | * | 10/1998 | Ottersten et al. | ........... 370/310 |
| 6,021,334 | A  | * | 2/2000  | Aste et al.       | ................. 455/561 |
| 6,347,234 | B1 | * | 2/2002  | Scherzer          | ................. 455/562.1 |
| 6,901,062 | B2 | * | 5/2005  | Scherzer et al.   | ............ 370/335 |
| 7,072,380 | B2 | * | 7/2006  | Ozluturk et al.   | ............ 375/141 |
| 7,139,324 | B1 | * | 11/2006 | Ylitalo et al.    | ............... 375/267 |

FOREIGN PATENT DOCUMENTS

| WO | WO 99/67962 | 12/1999 |
| WO | WO 00/51265 | 8/2000  |

* cited by examiner

*Primary Examiner*—Eliseo Ramos-Feliciano
*Assistant Examiner*—Jianye Wu
(74) *Attorney, Agent, or Firm*—Dorsey & Whitney LLP

(57) ABSTRACT

An apparatus and method for down-link multiple-antenna transmission in a wireless communication system is provided wherein a base station section comprises: a down-link specific physical channel unit, a second common pilot channel unit, a beam weighting unit of common pilot channels, a multiplexing and summing unit, a down-link specific physical channel weighting unit, a specific physical channel and second common pilot channel multiplexing unit, an antenna array unit, a multiple-beam weight vector set unit, up-link specific physical channels, and a feedback bit information unit; and a service cell section or mobile station section comprises: an antenna unit, a channel evaluating unit, a beam selection unit, and a beam quantizing unit. The space characteristics of the physical channels are utilized reasonably. Accordingly, a beam gain is obtained, interference is suppressed effectively, and the apparatus is easy to operate.

20 Claims, 2 Drawing Sheets

METHOD AND APPARATUS FOR DOWN-LINK FEEDBACK MULTIPLE ANTENNA TRANSMISSION IN WIRELESS COMMUNICATION SYSTEM

CROSS-REFERENCE TO RELATED APPLICATION

This utility patent application is a continuation application and claims priority of the PCT International Patent Application, serial number PCT/CN02/00087, filed on Feb. 10, 2002, which claims the priority of the Chinese patent application, serial number CN 01126301.6, filed on Jul. 20, 2001; subject matter of which are incorporated herewith by reference.

FIELD OF THE INVENTION

The present invention relates to a method and apparatus for down-link multiple-antenna transmission in a wireless communication system.

BACKGROUND OF THE INVENTION

The capacity of a wireless communication system depends on the capacity that the down-link links can support to a large extent. The traditional single-antenna transmission technology has been far unable to adapt to worse and worse wireless transmission environment. Advanced down-link transmission technology has played an important role in improving system performance and increasing capacity. Thus, various transmission technologies (related to time, multipath, space, and the like), which are able to obtain diversity gain, have been paid closer and closer attention and applied more and more in the recent years.

Two-antenna transmission diversity technology used for a base station (referred to as "Node B") in a code division multiple access (CDMA) system is determined by 3GPP Rel'99 protocol standard. It mainly uses the characteristics that signal fading during signal transmission is not associated with the fact that different antennas are used if the antennas are spaced apart with a distance larger than 10 wavelength of a carrier wave. So, the signals transmitted by the respective antennas are typically combined by employing a maximum ratio, thereby preventing multipath signal fading and enhancing system performance.

One of the wide-band features of a wide-band code division multiple access (WCDMA) system is to use multipath diversity of wireless transmission channels. The transmission antenna with increased number of Node B can be equivalent to increasing the number of propagation multipaths, which enables to obtain a larger gain of multipath diversity. Different technologies of multiple-antenna transmission diversity have been proposed in recent years.

Space diversity gain can be provided by an antenna array. Based on the same statistic characteristics of a domain of up- and down-link channels, the capacity of a wireless communication system can also be increased by formation technology which forms a wave beam of a down-link antenna array, wherein an evaluated up-link destination object angle (DOA) is utilized. However, the diversity gain obtained therein is limited.

Multiple-antenna closed-loop diversity array requires lager spaces between antenna units, normally larger than ten times of the wavelength. The multiple-antenna closed-loop diversity array will occupy more space. Multiple-antenna closed-loop diversity array requires higher feedback bits. If the original feedback rate does not change, the channel fading becomes worsen with higher speed, and the performance will be deteriorated. Furthermore, although multiple-antenna closed-loop diversity array has an effect for resisting the multipath fast fading, it cannot provide antenna gain and suppress the multiple access interference signals effectively.

It is often required by the multiple-antenna closed-loop diversity array that a user equipment (UE) calculate not only the short period fast variation weight vectors, but also the long period slow variation beam weight vector sets in each time slot. In one aspect, the complexity of UE is increased excessively while more feedback bits are required for feeding back the long period slow variation beam weight vector sets, even though the low feedback rate may be used by the slow variation beam weight vector sets.

The technology for forming down-link beams of an antenna array is still not perfect. A representative down-link method is based on that the statistic characteristics of the up- and down-link channels are the same, and DOA evaluated in an up-link is used to transmit in a down-link. In a frequency division duplex (FDD) mode, the difference between operation frequencies of up- and down-links would require a correction or adaptation system. Moreover, although the above method has space diversity gain, it does not resolve the problem of multipath fast fading.

SUMMARY OF THE INVENTION

One of the objectives of the present invention is to overcome the deficiencies in the art, and to provide a novel down-link feedback multiple-antenna transmission method and apparatus, which has simple structure and excellent performance and employs the second common pilot assisted multiple-beam feedback in a wireless communication system by incorporating the conception of multiple-beam and feedback.

In order to realize the objective of the present invention, the technical scheme used in the invention is an apparatus for down-link multiple-antenna transmission in a wireless communication system, comprising:

a base station comprising:
a down-link specific physical channel unit;
a first common pilot channel unit;
a beam weighting unit of common pilot channels;
a multiplexing and summing unit;
a down-link specific physical channel weighting unit;
a specific physical channel and second common pilot channel multiplexing unit;
an antenna array unit of the base station;
a multiple-beam weight vector set unit;
a feedback bit information unit for up-link specific physical channels; and
wherein in each time slot, signals of the down-link specific physical channel unit are outputted to the down-link specific physical channel weighting unit, and at the same time, transmission weight vectors of the down-link specific physical channel unit are determined by the multiple-beam weight vector set unit based on feedback bits of the feedback bit information unit of the up-link specific physical channels, determined transmission weight vectors are outputted by the multiple-beam weight vector set to the down-link specific physical channel weighting unit, and after weighting by the down-link specific physical channel weighting unit, signals are outputted to the specific physical channel and second common pilot multiplexing unit, each of orthogonal output signals of the first common pilot channel unit is weighted by using a corresponding beam weight vector; all of weighted orthogonal common pilot signals are outputted to a multiplexing and summing unit, the weighted orthogonal common pilot signals are summed and combined by the multiplexing and summing unit, and combined pilot signals are outputted to the specific physical channel and second common pilot multiplexing unit; and after the weighted signals of the specific channel and the weighted signals of the first common pilot channel are summed and combined by the specific physical channel and second common pilot multiplexing unit, the signals are outputted to the antenna array unit of the base station for transmitting; and the mobile station comprising:

an antenna unit;

a channel evaluating unit;

a beam selection unit;

a beam quantizing unit; and wherein the signals transmitted by the antenna array unit of the base station are received by the antenna unit of the mobile station, the received signals are outputted to the channel evaluating unit, evaluated channel responses are outputted by the channel evaluating unit to the beam selection unit, a beam weight vector is selected by the beam selection unit based on the evaluated channel responses, the determined beam weight vector is outputted by the beam selection unit to the beam quantizing unit, and in each time slot, the received signals of the orthogonal second common pilot and the antenna unit of the mobile station corresponding to K beams are utilized to correlate respectively by the channel evaluating unit to evaluate the combined channel responses weighted by each beam, wherein a "best" beam corresponding to maximum energy is selected by the beam selection unit based on the channel responses calculated by the beam evaluating unit, the best beam determined by the beam selection unit is quantized by the beam quantizing unit by using a certain number of bits and is fed back to the base station via the feedback bit information unit in an up-link specific control channel, and the weight vectors for the down-link specific channel in the next time slot are selected by the base station from the multiple-beam weight vector set unit based on the received feedback bits of the up-link specific channel, such that a closed-loop feedback procedure is configured for the transmission weight vectors of the base station.

Still in one embodiment, the multiple-beam weight vector set unit can be a one-stage beam vector set.

Further in one embodiment, the multiple-beam weight vector set unit can be two stages of the beam vector sets, wherein the two stages of the beam vector sets can be connected in sequence, and the output of the second stage of the beam weight vector set unit can be connected with the weight vector of the down-link specific channel.

Additionally in one embodiment, each of the channel evaluating unit, the beam selection unit, and the beam quantizing unit of the base station has one stage.

Yet in one embodiment, each of the channel evaluating unit, the beam selection unit, and the beam quantizing unit of the base station has two stages.

Still in one embodiment, the channel evaluating unit of the mobile station comprises an one-stage channel evaluating unit and a two-stage channel evaluating unit. The beam selection unit comprises an one-stage beam selection unit and a two-stage beam selection unit. The beam quantizing unit comprises an one-stage beam quantizing unit and a two-stage beam quantizing unit. The signals transmitted by the base station antenna array unit are received by the antenna unit and outputted simultaneously to the one-stage channel evaluating unit and the two-stage channel evaluating unit; the combined channel responses in each one-stage beam are evaluated respectively by the one-stage beam selection unit based on second common pilots corresponding to one-stage beam set, and all of the one-stage combined channel responses are outputted to the one-stage beam selection unit. The above one-stage combined channel responses are utilized by the one-stage beam selection unit to select an one-stage beam with the maximum energy. The selected one-stage beam is outputted to the two-stage channel evaluating unit and the one-stage beam quantizing unit, respectively. The determined one-stage beam is quantized with a certain number of bits by the one-stage beam quantizing unit. The combined channel responses in each two-stage beam is evaluated respectively by the two-stage channel evaluating unit based on the second common pilot corresponding to the two-stage beam involved in the one-stage beam. All of the two-stage combined channel responses are outputted to the two-stage beam selection unit. A two-stage beam with the maximum energy is selected by the two-stage beam selection unit from the two-stage beam weight vector set. The selected two-stage beam is outputted to the two-stage beam quantizing unit. The determined two-stage beam is quantized with a certain number of bits by the two-stage beam quantizing unit. The one-stage beam quantizing bits and the two-stage beam quantizing bits are transmitted back to the base station from the base station antenna via the feedback bit information domain of an up-link specific control channel by using a proper feedback format.

A method for a down-link multiple-antenna transmission in a wireless communication system which employs one-stage beam feedback, comprises:

(1) In a beginning phase of communication:

a. K beam weight vectors and K orthogonal second common pilots are determined properly by a base station, and relationships between the vectors and the pilots are made to be one-to-one correspondence;

b. In the beginning phase for establishing a link, information, such as selected beam weight vector sets and the second common pilots corresponding to each of the beams, and the like, is transmitted by the base station to all of mobile stations in a service cell via a high layer signaling over a broadcast channel;

(2) In a normal communication phase:

c. In each time slot, the respective beam weight vectors corresponding to K second common pilots are used respectively by the base station to weight K second common pilots, the weighted K second common pilots are multiplexed by a multiplexing and summing module, the multiplexed second common pilots are multiplexed again by a multiplexing unit with signals of a specific channel weighted by beams, and the multiplexed signals are transmitted via an antenna array unit of the base station;

d. In each time slot, different second common pilots corresponding to K beams are utilized by the channel evaluating unit of the mobile station to evaluate combined channel responses weighted by each beam from received signals of an antenna unit by using a correlation accumulating method; and a beam with the determined maximum energy is selected by the beam selection unit based on the combined channel responses obtained by the channel evaluating unit, then, after the selected beam is quantized with a certain number of bits by the beam quantizing unit, it is fed back to base station via FBI domain of the up-link specific physical control channel; and e. The corresponding beams are selected by the base station from the multiple-beam weight vector set as the weighting transmission vectors of the signals of the down-link specific channel in the next time slot based on the received feedback bits, and a transmission weight closed-loop feedback loop for the down-link specific channel is configured.

The method for the above down-link multiple-antenna transmission in a wireless communication system, wherein equal power transmission or unequal power transmission is used for the second common pilot in each beam.

The method for the above down-link multiple-antenna transmission in a wireless communication system, wherein the entire cell can be covered by the selected K beam vectors, which are configured as the multiple-beam weight vector sets.

The method for the above down-link multiple-antenna transmission in a wireless communication system, wherein the selected K orthogonal second common pilots and K beans are configured with a relationship of one to one correspondence.

The method for the above down-link multiple-antenna transmission in a wireless communication system, wherein a directive weighting transmission method is employed for K orthogonal second common pilots.

The method for the above down-link multiple-antenna transmission in a wireless communication system, wherein the second common pilot channels are used by the mobile station as the down-link phase references.

The method for the above down-link multiple-antenna transmission in a wireless communication system, wherein in the beginning phase for establishing a link, the information, such as the beam weight vector sets and the second common pilots corresponding to each of the beams, and the like, is transmitted via the high layer signaling over the broadcast channel in the entire cell.

The method for the above down-link multiple-antenna transmission in a wireless communication system, wherein the distance between the elements of the base station array unit is determined based on the space size occupied by the array of the base station.

The method for the above down-link multiple-antenna transmission in a wireless communication system, wherein the distance between the elements of the base station array unit is one half of the carrier wavelength.

The method for the above down-link multiple-antenna transmission in a wireless communication system, wherein in the step d, the beam selection unit can select a beam with the maximum energy or can also select several beams with larger energy to perform beam combination.

The method for the above down-link multiple-antenna transmission in a wireless communication system, wherein the one-stage beam feedback method requires $[\log_2^k]$ feedback bits.

The method for the above down-link multiple-antenna transmission in a wireless communication system which employs the two-stage beam feedback, comprises:

(1) In the beginning phase of the communication:

a. K beam weight vectors and K orthogonal second common pilots are determined properly by the base station, and the relationships between them are made to be one-to-one correspondence;

b. In the beginning phase for establishing a link, the information, such as the selected beam weight vector sets and the second common pilots corresponding to each of the beams, and the like, is transmitted by the base station to all of the mobile stations in the service cell via the high layer signaling over the broadcast channel;

(2) In the normal communication phase:

c. In each time slot, the respective beam weight vectors corresponding to K second common pilots are used respectively by the base station to weight K second common pilots, and the weighted K second common pilots are multiplexed by the multiplexing and summing module, the multiplexed second common pilots are multiplexed again by the multiplexing unit with the signals of the specific channel weighted by the beams, and the multiplexed signals are transmitted via the antenna array unit of the base station;

d. In each time slot, the correlation accumulation of the second common pilots in the one-stage beam sets are used by the one-stage channel evaluating unit of the mobile station to calculate the combined channel responses of J one-stage beams; and a beam with the maximum energy is selected by the one-stage beam selection unit based on the evaluated one-stage combined channel responses and is quantized by using a certain number of bits; based on the one-stage beam determined by the one-stage beam selection unit, the correlation accumulation of the second common pilots corresponding to the two-stage beam involved in the determined one-stage beam is used by the two-stage beam selection unit to calculate Q two-stage beam corresponding channel responses, then a two-stage beam is selected by the two-stage beam selection unit, and the determined two-stage beam is quantized by the two-stage beam quantizing unit by using a certain number of bits; and by using a proper multiplexing format, the one-stage beam quantizing bits and the two-stage beam quantizing bits are fed back to the base station via the feedback bit information domain of the up-link specific control channel; and e. Firstly, the corresponding one-stage beam and the two-stage multiple-beam weight vector set involved in the one-stage beam are found from the one-stage multiple-beam weight vector sets by the base station based on the one-stage feedback bits received on the up-link specific control channel, then the corresponding two-stage beam is found from the two-stage beam set by the base station as the transmission weight vectors for the down-link specific channel in the next time slot based on the received two-stage feedback bits, and the closed-loop feedback procedure for the transmission weight of the down-link specific channel is configured.

The method for the above down-link multiple-antenna transmission in a wireless communication system, wherein the two-stage beam selected by the two-stage beam selection unit is the one having the maximum energy or is the combination of several beams with larger energy.

The method for the above down-link multiple-antenna transmission in a wireless communication system, wherein the two-stage multiple-beam feedback method requires $[\log_2^k]$ one-stage feedback bits and $[\log_2^Q]$ two-stage feedback bits.

BRIEF DESCRIPTION OF THE DRAWINGS

The specific features and characteristics of the invention will be further described by the following embodiments and the drawings.

DETAILED DESCRIPTION OF THE PREFERRED EMBODIMENTS

Figure 1:
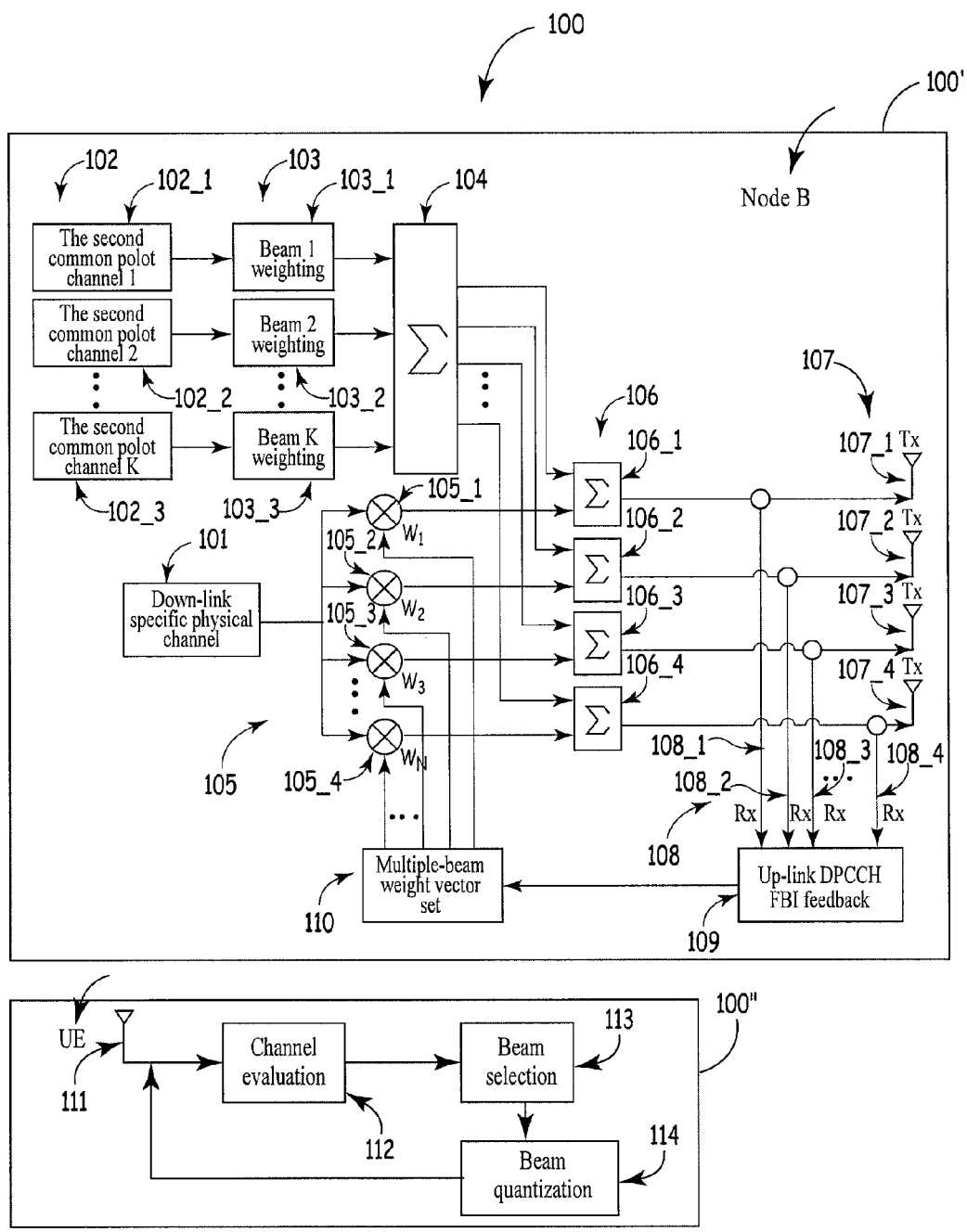
FIG. 1 is a block diagram of one embodiment of the present invention for implementing transmission by employing a second common pilot assisted multiple-beam feedback method.

As shown in FIG. 1, an apparatus 100 for down-link multiple-antenna transmission in a wireless communication system in the present invention comprises a base station section 100' and a mobile station section 100".

The base station section 100' comprises: a down-link specific physical channel unit 101, a second common pilot channel unit 102, a beam weighting unit 103 coupled to the common pilot channel unit 102, a multiplexing and summing unit 104 coupled to the beam weighting unit 103, a down-link specific physical channel weighting unit 105, a specific physical channel and second common pilot channel multiplexing unit 106, an antenna array unit 107 of the base station, a multiple-beam weight vector set unit 110, and a feedback bit information (DPCCH FBI) feedback unit 109 for up-link specific physical control channels.

An output of the down-link specific physical channel unit 101 is coupled to an input of the down-link specific physical channel weighting unit 105. An output terminal of the multiple-beam weight vector set unit 110 is coupled to a second input of the down-link specific physical channel weighting unit 105. An output of the down-link specific physical channel weighting unit 105 is sent to the specific physical channel and second common pilot channel multiplexing unit 106.

An output of each of the orthogonal second common pilots 102 is coupled to each of the corresponding input of the beam weight vectors 103. An output of each beam weight vector 103 is coupled to the multiplexing and summing unit 104. Outputs of the multiplexing and summing unit 104 are sent to the specific physical channel and second common pilot channel multiplexing unit 106. Outputs of the specific physical channel and second common pilot channel multiplexing unit 106 are sent to the antenna array unit 107 of the base station 100' for transmitting. The outputs of the unit 106 are also fed back to the up-link DPCCH FB1 feedback unit 109. An output of the feedback unit 109 is sent to the multiple-beam weight vector set unit 110. An output of the multiple-beam weight vector set unit 110 is sent to the down-link specific physical channel weighting unit 105 for weighing.

Also as shown in FIG. 1, the mobile station section 100" comprises: an antenna unit 111, a channel evaluating unit 112, a beam selection unit 113, and a beam quantizing unit 114.

The signals transmitted by the base station antenna 107 are received by the antenna unit 111 and outputted to the channel evaluating unit 112. The evaluated signals are outputted by the channel evaluating unit 112 to the beam selection unit 113. The signals are then sent to the beam quantizing unit 114. In each time slot, different second common pilots corresponding to K beams are utilized by the channel evaluating unit 112 to evaluate the combined channel responses weighted by each beam from the signals received from the antenna unit 111. The "best" beam corresponding to the maximum energy is selected by the beam selection unit 113 based on the channel responses calculated by the channel evaluating unit 112. The best beam determined by the beam selection unit 113 is quantized by the beam quantizing unit 114 and fed back to the base station 100' (Node B) via FBI domain of the up-link DPCCH. The array weighting vectors for the down-link specific physical channel weighting unit 105 in the next time slot are selected accordingly by the base station 100' (UTRAN) from the multiple-beam weight vector set 110 based on the received feedback bits of the up-link DPCCH FBI feedback unit 109, whereby a closed-loop feedback procedure has been configured for the transmission weight.

One of the transmission methods of the present invention comprises the steps of: determining K beam weight vectors 103 and K orthogonal second common pilots 102 wherein the relationships between the K beam weight vectors 103 and the K orthogonal second common pilots 102 are made to be one-on-one correspondence, i.e., a unique second common pilot is configured in one beam. For the second common pilot in each beam, equal power transmission is used. Unequal power transmission can also be used. The selected K beam vectors can cover the entire cell to configure multiple-beam weight vector set $110\{\vec{W}_1, \vec{W}_2, \ldots \vec{W}_K\}$. In the beginning phase for establishing a link, the information, such as the selected beam weight vector sets and the second common pilots corresponding to each of the beams, and the like, is transmitted via a high layer signaling in the entire cell over BCH. In each time slot of the normal communication, K second common pilots are weighted by using respectively its corresponding beam weight vector. After going through the multiplexing and summing unit 104, the K second common pilots are multiplexed again by the multiplexing unit 106 with the specific channels weighted by the beams. The multiplexed signals are transmitted by the antenna array unit 107 of the base station 101'. The distance between the elements of the base station antenna array unit 107 is determined based on the specific condition within the region of the service cell. If it is selected to make the central frequency of the carrier corresponding to one half of the wavelength, the occupied space of the antenna array will be small. For a UE (User Equipment) in each time slot, different second common pilots corresponding to K beams are utilized by the channel evaluating unit 112 to evaluate from the signals received by the antenna unit 111, the combined channel responses weighted by each beam, $\vec{W}_k^H H$, k=1, 2, ... K, wherein, $H = [\vec{h}_1, \vec{h}_2, \ldots, \vec{h}_L]$, L represents the number of the multipath with priority energy, h→j represents the array channel response of the jth path, wherein, $\vec{h}_j \in C^N$, j=1,2, ..., L, N is the number of the array elements of the transmission array 107 of the base station 101'. The "best" beam corresponding to the maximum energy (or several beams with larger energy, the following description is only based on one best beam) is selected by the beam selection unit 113 based on the channel responses calculated by the beam evaluating unit 112, that is $$\vec{W}_m = \vec{W}_k \in \{\vec{W}_1, \ldots, \vec{W}_2, \ldots, \vec{W}_K\}^{\max|\vec{W}_k^H H|^2}_{arg} \quad (1)$$

The best beam determined by the beam selection unit 113 is quantized by the beam quantizing unit 114. The quantized best beam is fed back to Node B via FBI domain of the up-link DPCCH. [$\log_2^k$] bits can be used to indicate a selected beam. The array weighting vectors 105 for the down-link specific channel in the next time slot are selected correspondingly from the multiple-beam weight vector set $\{\vec{W}_1, \vec{W}_2, \ldots, \vec{W}_K\}$ by UTRAN based on the received feedback bits of the up-link DPCCH, whereby a closed-loop feedback procedure of a transmission weight is configured.

The first implementation method of the second common pilot assisted multiple-beam feedback method is shown in FIG. 1, that is, an one-stage beam feedback method is employed. In the method, an UE requires to calculate the combined channel responses weighted by K beams, and the signal energy in K beams are compared based on equation (1).

When the number K of the beams is large in the multiple-beam weight vector set, a large amount of the calculation will be calculated by UE, and a large amount of feedback bits are required. Thus, the structure of FIG. 1 can be modified slightly, and a two-stage beam selection strategy may be selected to reduce the amount of the calculation calculated by UE and the required feedback bits, thereby improving the performance. An one-stage multiple-beam weight vector set 210-1$\{\vec{W}_1, \vec{W}_2, \ldots, \vec{W}_J\}$ is selected to cover the entire service region, and one-stage beams distributes sparsely. For each beam j in the one-stage beam set, a dense two-stage multiple-beam weight vector set 210-2$\{\vec{W}_{j1}, \vec{W}_{j2}, \ldots, \vec{W}_{jQ}\}$ is selected to cover the one-stage beam j. A unique second common pilot is assigned to each one-stage beam and two-stage beam, and it is transmitted via BCH.

Figure 2:
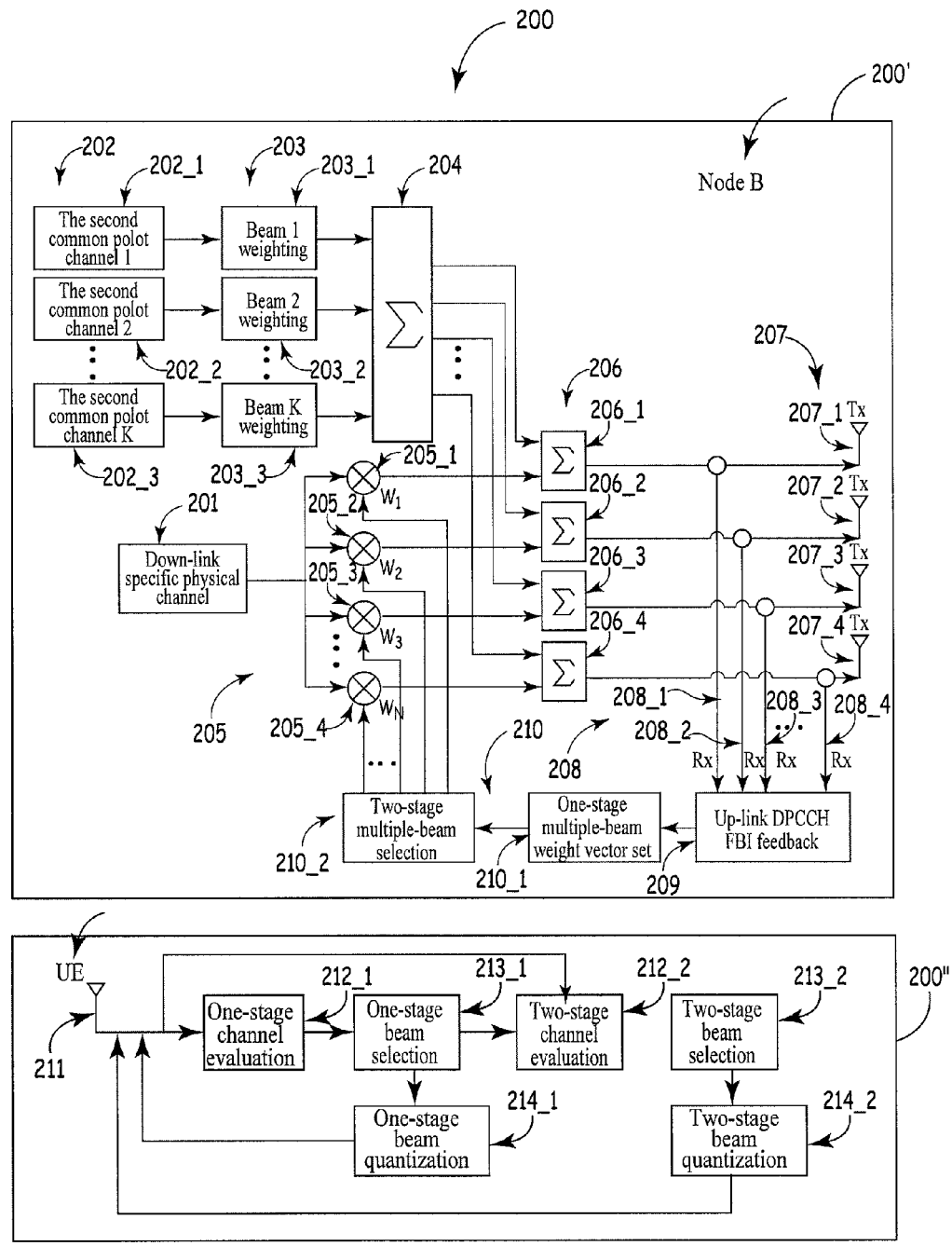
FIG. 2 is a block diagram of another embodiment of the present invention for implementing transmission by employing a second common pilot assisted multiple-beam feedback method.

The apparatus in FIG. 2 is similar to that of in FIG. 1, the base station section 200' comprises: a down-link specific physical channel unit 201, a second common pilot channel unit 202, a beam weighting unit 203 coupled to the common pilot channel unit 202, a multiplexing and summing unit 204 coupled to the beam weighting unit 203, a down-link specific physical channel weighting unit 205, a specific physical channel and second common pilot channel multiplexing unit 206, an antenna array unit 207 of the base station 200', a multiple-beam weight vector set unit 210, and an up-link DPCCH FBI feedback unit 109. The multiple-beam weight vector unit 210 has two stages 210-1 and 210-2 connected in sequence. An output of the second stage of multiple-beam weight vector set 210-2 is connected with the array weighting vector unit 205 of the down-link specific channel unit 201.

The mobile station section 200'' comprises: an antenna unit 211, a channel evaluating unit 212, a beam selection unit 213, and a beam quantizing unit 214. Each of the channel evaluating unit 212, the beam selection unit 113, and the beam quantizing unit 114 in the service cell has two stages. In a service cell, the channel evaluating unit 212 comprises one-stage channel evaluating unit 212-1 and two-stage channel evaluating unit 212-2. The beam selection unit 213 comprises one-stage beam selection unit 213-1 and two-stage beam selection unit 213-2. The beam quantizing unit 214 comprises one-stage beam quantizing unit 214-1 and two-stage beam quantizing unit 214-2. The signals transmitted by the base station antenna 207 are received by the antenna unit 211. The signals are sent to the one-stage channel evaluating unit 212-1 and simultaneously to the two-stage channel evaluating unit 212-2. The evaluated signals are outputted by the one-stage channel evaluating unit 212-1 to the one-stage beam selection unit 213-1, and the selected beams are sent by the one-stage beam selection unit 213-1 to the two-stage channel evaluating unit 212-2 and simultaneously to the one-stage beam quantizing unit 214-1. The signals outputted by the one-stage beam quantizing unit 214-1 are sent to the antenna 211 for transmitting.

Also, the evaluated signals from the two-stage channel evaluation unit 212_2 are sent to the two-stage beam selection unit 213_2. An output from the two-stage beam selection unit 213_2 is sent to the two-stage beam quantizing unit 214-2, an output of which is sent to the antenna 211 for transmitting to the base station 200'.

Also as shown in FIG. 2, the transmission method thereof is: in the mobile station 200'' in each time slot, the second common pilots in the one-stage beam set are utilized by the one-stage channel evaluating unit 212-1 to calculate the combined channel responses, $\vec{W}_j^H H$, j=1,2, ..., J, weighted by each beam in the one-stage multiple-beam weight vector set. The best one among the one-stage beams is selected by the one-stage beam selection unit 213-1 based on the combined channel responses calculated by the one-stage channel evaluating unit, that is $$\vec{W}_m = \vec{W}_k \in \{\vec{W}_1, \ldots, \vec{W}_2, \ldots, \vec{W}_J\}^{\arg\max |\vec{W}_j^H H|^2} \quad (2)$$

The selected best one-stage beam is quantized by the one-stage beam quantizing unit 214-1. Based on the result of the one-stage beam selection unit 213-1, only the common pilot of the two-stage beam set involved in the best one-stage beam is utilized by the two-stage channel evaluating unit 212-2 to calculate the channel responses, $\vec{W}_{mq}^H H$, q=1, 2, ..., Q, of each of the two-stage beams, then one (or several) "best" two-stage beam(s) are determined by the two-stage beam selection unit 213-2 in the two-stage beam set involved in the best one-stage beam, that is $$\vec{W}_{mp} = \vec{W}_{mq} \in \{\vec{W}_{m1}, \ldots, \vec{W}_{m2}, \ldots, \vec{W}_{mQ}\}^{\arg\max |\vec{W}_{mq}^H H|^2} \quad (3)$$

Then, the selected best two-stage beam is quantized by the two-stage beam quantizing unit 214-2. By using a proper feedback format, the one-stage beam quantizing bits and the two-stage beam quantizing bits are fed back to UTRAN via the up-link DPCCH FBI domain. The two stages of multiple-beam feedback method require $[\log_2^J]$ one-stage feedback bits and $[\log_2^Q]$ two-stage feedback bits. When applying practically, because the one-stage beams are sparse, it can be seen as slow variation. Therefore, low feedback rate can be employed. The array weighting vectors $\vec{W}_{mq}$ for the down-link specific channel in the next time slot is selected firstly from the best one-stage beam $\vec{W}_m$ in the one-stage multiple-beam weight vector set $\{\vec{W}_1, \vec{W}_2, \ldots, \vec{W}_J\}$ based on the received one-stage feedback bits of the up-link DPCCH, then from the two-stage multiple-beam weight vector set $\{\vec{W}_1, \vec{W}_2, \ldots, \vec{W}_{mQ}\}$ based on the two-stage feedback bits, whereby a closed-loop feedback procedure is configured for the transmission weight.

One of the advantages of the second common pilot assisted multiple-beam feedback method used in the present invention is that a small space is occupied by the array transmitter. Further, the complexity of calculation for UE and UTRAN is reduced. Also, not only the antenna gain is provided and the multiple access interference is suppressed, but also the result for resisting multipath fast fading can be obtained.

INDUSTRIAL APPLICATION

The multiple-beam weight vector set in the multiple-antenna transmission method of the present invention can be retrieved as the down-link weight vector set which is obtained based on mapping the received up-link weight vector set. The multiple-beam weight vector set in the multiple-antenna transmission method is also suitable for the up-link based down-link transmission method. By comparing with the prior technology, the features and resulting advantages are at least as follows:

1. The multiple-beam weight vector set for covering the entire cell is preset. In each time slot, only a small amount of calculation of the beam selection is required to calculate by UE based on the evaluated channel responses. Therefore, the complexity of the calculation of UE is reduced, and less feedback bits are required.

2. Because the beam formation technology is used in the invention, the space characteristic of the channels are utilized. The beam gain can be obtained, and the interference can be suppressed effectively. Also, the interference to the other mobile stations can be reduced. The fast fading can be suppressed and the diversity function can be produced by switching between the beams.

3. The pilot assisted method is used in the present invention. Because the common pilots are transmitted directionally, the channel responses evaluated by utilizing this directional transmitting common pilot are more precise. So, comparing with transmitting the pilots in all directions, the performance of the present invention is much better.

4. Furthermore, the transmission antenna of the base station in the present invention occupies less space and is easy to implement.

What is claimed is:

1. An apparatus for down-link multiple-antenna transmission in a wireless communication system, comprising:

a base station section which comprises:
   a down-link specific physical channel unit;
   a second common pilot channel unit;
   a beam weighting unit coupled to the second common pilot channel unit;
   a multiplexing and summing unit coupled to the beam weighting unit;
   a down-link specific physical channel weighting unit coupled to the down-link specific physical channel unit;
   a specific physical channel and second common pilot channel multiplexing unit coupled to the multiplexing and summing unit and the down-link specific physical channel weighting unit;
   an antenna array unit coupled to the specific physical channel and second common pilot channel multiplexing unit;
   a multiple-beam weight vector set unit coupled to the down-link specific physical channel weighting unit; and
   a feedback bit information unit sampling signals from the specific physical channel and second common pilot channel multiplexing unit and feeding back to the multiple-beam weight vector set unit for up-linking specific physical channels;
   wherein in each time slot, signals of the down-link specific physical channel unit are outputted to the down-link specific physical channel weighting unit, transmission weight vectors of the down-link specific physical channel weighting unit are determined by the multiple-beam weight vector set unit based on feedback bits of the feedback bit information unit in an up-link specific control channel, the determined transmission weight vectors are outputted by the multiple-beam weight vector set unit to the down-link specific physical channel weighting unit, after weighting by the down-link specific physical channel weighting unit, the signals are outputted to the specific physical channel and second common pilot channel multiplexing unit, each of orthogonal output signals of the second common pilot channel unit is weighted by using a corresponding beam weight vector of the beam weighting unit, the weighted orthogonal common pilot signals are outputted to the multiplexing and summing unit, the weighted second common pilot signals are summed and combined by the multiplexing and summing unit, and combined pilot signals are outputted from the multiplexing and summing unit to the specific physical channel and second common pilot channel multiplexing unit; and after being summed and combined by the specific physical channel and second common pilot channel multiplexing unit, weighted signals of specific channels and weighted signals of second common pilot channels are outputted to the antenna array unit of the base station for transmitting; and the mobile station section which comprises:
   an antenna unit;
   a channel evaluation unit coupled to the antenna unit;
   a beam selection unit coupled to the channel evaluating unit; and
   a beam quantization unit coupled to the beam selection unit;
   wherein the signals transmitted by the antenna array unit of the base station are received by the antenna unit of the mobile station, and the received signals are outputted to the channel evaluation unit, the evaluated channel responses are outputted by the channel evaluation unit to the beam selection unit, a beam weight vector is selected by the beam selection unit based on the evaluated channel responses, the selected beam weight vector is outputted by the beam selection unit to the beam quantization unit, wherein in each time slot, the received signals and the antenna unit of the mobile station corresponding to K beams are utilized to correlate respectively by the channel evaluation unit to evaluate the combined channel responses weighted by each beam, whereby a "best" beam corresponding to maximum energy is selected by the beam selection unit based on the combined channel responses calculated by the beam selection unit, the best beam determined by the beam selection unit is quantized by the beam quantization unit by using a certain number of bits, and the quantized beam is fed back to the base station via the antenna unit of the mobile station and the antenna array unit of the base station to the feedback bit information unit in the up-link specific control channel, and array weighting vectors for the down-link specific physical channel unit in a next time slot are selected by the base station from the multiple-beam weight vector set unit based on received feedback bits on the up-link specific channel, whereby a closed-loop feedback procedure is configured for transmission weight vectors of the base station.

2. The apparatus of claim 1, wherein the multiple-beam weight vector set unit is an one-stage beam vector set.

3. The apparatus of claim 1, wherein the multiple-beam weight vector set unit is a two-stage beam vector set, two stages of beam weighting vector sets are connected in sequence, and an output of the second stage multiple-beam weight vector set unit is coupled to the down-link specific physical channel weighting unit.

4. The apparatus of claim 1, wherein each of the channel evaluation unit, the beam selection unit, and the beam quantization unit of the base station has one stage.

5. The apparatus of claim 1, wherein each of the channel evaluation unit, the beam selection unit, and the beam quantization unit of the base station has two stages.

6. The apparatus of claim 1, wherein the channel evaluation unit of the mobile station comprises an one-stage channel evaluation unit and a two-stage channel evaluation unit, the beam selection unit comprises an one-stage beam selection unit and a two-stage beam selection unit, the beam quantization unit comprises an one-stage beam quantization unit and a two-stage beam quantization unit; the signals transmitted by the antenna array unit of the base station are received by the antenna unit of the mobile station and are outputted to the one-stage channel evaluation unit and the two-stage channel evaluation unit, combined channel responses in each one-stage beam are evaluated respectively by the one-stage beam selection unit based on second common pilots corresponding to one-stage beams, and all of the one-stage combined channel responses are outputted to the one-stage beam selection unit, the one-stage combined channel responses are utilized by the one-stage beam selection unit to select an one-stage beam with maximum energy, the selected one-stage beam is outputted to the two-stage channel evaluation unit and the one-stage beam quantization unit, respectively, the selected one-stage beams are quantized with a certain number of bits by the one-stage beam quantization unit, the combined channel responses in each two-stage beam are evaluated respectively by the two-stage channel evaluation unit based on a second common pilot corresponding to a two-stage beam involved in the one-stage beam, and the two-stage combined channel responses are outputted to the two-stage beam selection unit, a two-stage beam with maximum energy is selected by the two-stage beam selection unit in the two-stage beam weight vector set, the selected two-stage beam is outputted to the two-stage beam quantization unit, the selected two-stage beam is quantized with a certain number of bits by the two-stage beam quantization unit; and by using a proper feedback format, the one-stage beam quantizing bits and the two-stage beam quantizing bits are transmitted back to the antenna array unit of the base station from the antenna unit of the mobile station.

7. A method for down-link multiple-antenna transmission in a wireless communication system which employs an one-stage beam feedback, comprising:

(1) In a beginning communication phase to establish a communication link, a) determining K beam weight vectors and K orthogonal second common pilots by a base station, wherein relationships between the K beam weight vectors and K orthogonal second common pilots are made to be one-on-one correspondence;

b) transmitting information including selected beam weight vector sets and second common pilots corresponding to each of beams, by the base station via a layer signaling to a mobile station in a service cell over a broadcast channel;

(2) In a normal communication phase:

c) weighting K second common pilots, in each time slot, by using beam weight vectors corresponding to K second common pilots, respectively, by the base station, wherein the weighted K second common pilots are multiplexed by a multiplexing and summing unit, the multiplexed second common pilots are multiplexed again by a multiplexing unit with signals of a specific channel weighted by beams, and the multiplexed signals are transmitted via an antenna array unit of the base station;

d) evaluating combined channel responses weighted by each beam from the received signals of the antenna array unit of the base station in each time slot by a channel evaluation unit of the mobile station, wherein different second common pilots corresponding to K beams are used to evaluate the combined channel responses weighted by each beam from the received signals of the antenna unit of the mobile station, and a beam with maximum energy is selected by a beam selection unit based on combined channel responses obtained by the channel evaluation unit, after a selected beam is quantized with a certain number of bits by a beam quantization unit, the quantized beam is fed back to the base station via the antenna unit of the mobile station and the antenna array unit of the base station; and e) selecting corresponding beams by the base station from a multiple-beam weight vector set as weighting transmission vectors of signals of a down-link specific channel in a next time slot based on received feedback bits, wherein a transmission weight closed-loop feedback loop for the down-link specific channel is configured.

8. The method of claim 7, wherein power transmission is used for a second common pilot in each beam.

9. The method of claim 7, wherein an entire cell is covered by selected K beam vectors, which are configured as multiple-beam weight vector sets.

10. The method of claim 7, wherein the selected K orthogonal second common pilots and the K beams are configured with a relationship of one-on-one correspondence.

11. The method of claim 7, wherein a directive weighting transmission method is employed for the K orthogonal second common pilots.

12. The method of claim 7, wherein the second common pilot channels are used by the mobile station as down-link phase references.

13. The method of claim 7, wherein in the beginning communication phase for establishing the communication link, information including the beam weight vector sets and the second common pilots corresponding to each of the beams, is transmitted in an entire cell via a high layer signaling over a broadcast channel.

14. The method of claim 7, wherein a distance between elements of the antenna array unit is determined based on a space size occupied by the antenna array of the base station.

15. The method of claim 7, wherein a distance between elements of the antenna array unit is one half of a carrier wavelength.

16. The method of claim 7, wherein in the step d), the beam selection unit selects at least one beam with maximum energy.

17. The method of claim 7, wherein an one-stage beam feedback method requires $\lceil \log_2^k \rceil$ feedback bits.

18. A method for down-link multiple-antenna transmission in a wireless communication system which employs a two-stage beam feedback, comprising:
(1) In a beginning communication phase to establish a communication link:
a) determining K beam weight vectors and K orthogonal second common pilots by a base station, wherein relationships between the K beam weight vectors and K orthogonal second common pilots are made to be one-on-one correspondence;
b) transmitting information including selected beam weight vector sets and second common pilots corresponding to each of beams, by the base station via a layer signaling to a mobile station in a service cell over a broadcast channel;
(2) In a normal communication phase:
c) weighting K second common pilots, in each time slot, by using beam weight vectors corresponding to K second common pilots, respectively, by the base station, wherein the weighted K second common pilots are multiplexed by a multiplexing and summing unit, the multiplexed second common pilots are multiplexed again by a multiplexing unit with signals of a specific channel weighted by beams, and the multiplexed signals are transmitted via an antenna array unit of the base station;
d) calculating the combined channel responses of one-stage beams in each time slot, wherein correlation accumulation of second common pilots in one-stage beam sets is used by an one-stage channel evaluation unit of the mobile station, and a beam with maximum energy is selected by an one-stage beam selection unit based on evaluated one-stage combined channel responses and is quantized by using a certain number of bits, and based on an one-stage beam selected by the one-stage beam selection unit, the correlation accumulation of the second common pilots corresponding to a two-stage beam involved in the determined one-stage beam is used by a two-stage beam selection unit to calculate a two-stage beam corresponding channel responses, then a two-stage beam is selected by the two-stage beam selection unit, and the selected two-stage beam is quantized by a two-stage beam quantization unit by using a certain number of bits, and by using a multiplexing format, one-stage beam quantizing bits and two-stage beam quantizing bits are fed back to the base station via an antenna unit of the mobile station and the antenna array unit of the base station; and
e) determining corresponding one-stage beam and two-stage multiple-beam weight vector sets involved in the one-stage beam by the base station from one-stage multiple-beam weight vector sets based on one-stage feedback bits received from the antenna array unit of the base station, then determining corresponding two-stage beam by the base station from the two-stage beam sets as transmission weight vectors for a down-link specific channel in a next time slot based on received two-stage feedback bits, and a closed-loop feedback procedure for transmission weight of the down-link specific channel is configured.

19. The method of claim 18, wherein the two-stage beam selected by the two-stage beam selection unit is at least one beam having maximum energy.

20. The method of claim 18, wherein a two-stage multiple-beam feedback method requires $[\log_2^k]$ one-stage feedback bits and $[\log_2^Q]$ two-stage feedback bits.

* * * * *